M. A. & T. M. DEES.
ANTISKIDDING VEHICLE WHEEL TIRE.
APPLICATION FILED MAR. 23, 1911.
1,067,507.
Patented July 15, 1913.
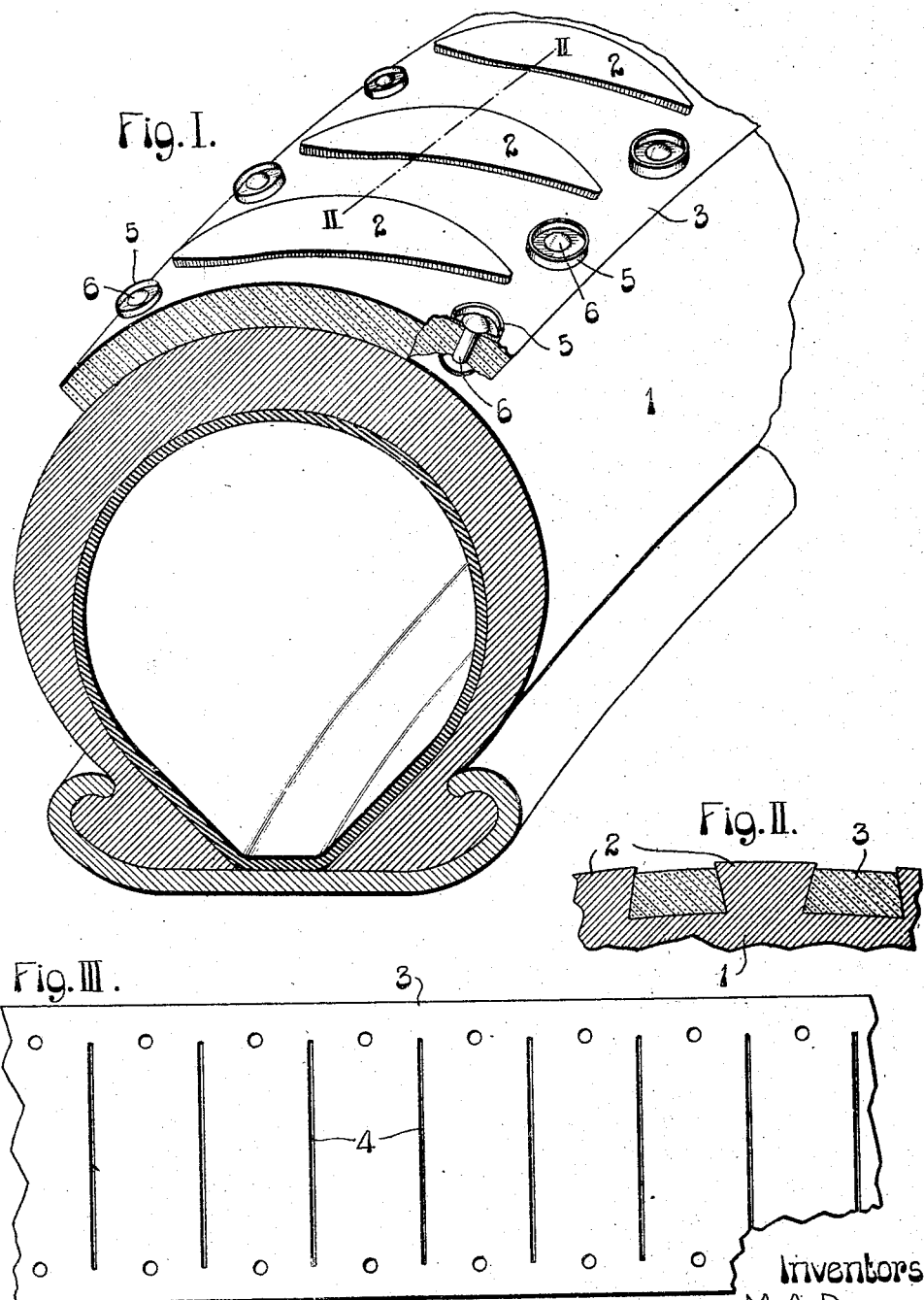
Inventors
M.A. Dees
T.M. Dees

UNITED STATES PATENT OFFICE.

MARK A. DEES, OF PASCAGOULA, MISSISSIPPI, AND THOMAS M. DEES, OF MIDLOTHIAN, TEXAS, ASSIGNORS TO AMERICAN TIRE COMPANY, OF ST. LOUIS, MISSOURI, A CORPORATION OF MISSOURI.

ANTISKIDDING VEHICLE WHEEL-TIRE.

1,067,507. Specification of Letters Patent. Patented July 15, 1913.

Application filed March 23, 1911. Serial No. 616,341.

*To all whom it may concern:*

Be it known that we, MARK A. DEES and THOMAS M. DEES, citizens of the United States of America, and residents of Pascagoula, in the county of Jackson and State of Mississippi, and Midlothian, in the county of Ellis and State of Texas, respectively, have invented certain new and useful Improvements in Antiskidding Vehicle Wheel-Tires, of which the following is a full, clear, and exact description, reference being had to the accompanying drawings, forming part of this specification.

Our invention relates to vehicle wheel tires and pertains particularly to the tread structure which is of such nature as to prevent slippage or skidding of the tires upon either wet or icy roadways.

Numerous efforts have heretofore been made to provide pneumatic tires with tread structures that will not be susceptible to slipping or skidding on roadways under various conditions of the roadway, but in so far as we are aware these efforts have not resulted in the production of a tire having an entirely satisfactory anti-slipping tread surface combining elements that are necessary to produce the most satisfactory results when used at one time upon wet roadways and at another time upon icy roadways, this being due to the fact that a tread surface structure which is entirely satisfactory on a wet roadway is usually unsatisfactory on an icy roadway; and on the other hand, a tread surface structure which is not susceptible to slippage on an icy roadway is usually unsatisfactory on a wet roadway.

The object of our invention is to provide a tread structure of such nature as to obviate slippage thereof on either wet or icy roadways, and with this object in mind the invention may be briefly stated to comprise protuberances of rubber projecting from a pneumatic tire casing which are not liable to slip on an icy roadway, and a band of leather which is not liable to slippage on a wet roadway, the leather band circumferentially encircling the tire casing and being apertured to permit the extension of the rubber protuberances therethrough.

The structure further contemplates the provision of metallic devices in addition thereto adapted to embed themselves in or cut into a roadway, either in a wet or icy condition and which serve as members auxiliary to either the rubber or leather elements of our tread surfaces.

Figure I is in part a perspective view and in part a cross section of a fragment of our anti-skidding vehicle wheel tire. Fig. II is a longitudinal section taken on line II—II, Fig. I. Fig. III is a face view of a leather band entering into the structure of our tire.

In the accompanying drawings: 1 designates the outer casing of a pneumatic tire, having the usual rubber tread. At the tread of the casing 1 are protuberances or bosses 2 formed integral with the rubber tread of the casing and of the same material. These protuberances are of greater length than breadth and they extend transversely of the tire casing, being preferably of approximately elliptical shape so that they are narrower at their ends than they are intermediate of their ends. The protuberances are dovetail shape in cross section.

3 designates an endless leather band encircling the tire casing 1 at its tread. This leather band is provided at intervals with narrow transverse slits 4 located wholly within the side margins of the band. The leather that is utilized in producing the band 3 is of soft leather, or what is commercially known as "chrome leather", and in applying the band to the tread of the tire casing, it is placed circumferentially around the casing after the tire has been inflated and the slits are spread sufficiently to permit the passage of the rubber protuberances therethrough in order that the leather band will fit against the main tread surface of the tire casing and the protuberances will project slightly beyond the leather band. In thus applying the leather band, the leather therein intermediate of the slits is compressed and expanded outwardly with the result of thickening the portions of the leather intermediate of the rubber protuberances and thus disposing the planes of the outer surfaces of these portions in close proximity to the planes of the surfaces of these protuberances to provide for their contact with the roadway, notwithstanding the interpositioning of the rubber protuberances between them. When the leather band is applied to the tire casing, as explained, its tread portion intermediate of the rubber protuberances to which the band is fitted become wedged in the dove-tail groove between said protuberances with the result that the band is interlocked with the protuberances and firmly and securely held around the tire casing.

In the use of our tire, the rubber protuberances 2 will adhere to an icy roadway without slipping thereon to any appreciable extent, and inasmuch as the rubber protuberances constitute a large portion of the tread surface of the tire, the fact that the remainder of the tread surface is a leather one does not detract materially from the efficiency of the tread portions of the tire intended to obviate skidding of the tire on an icy surface. Further, the leather in the structure of the band 3 will not permit the slippage on a wet surface; and when the tire is traveling on a wet roadway, the tread portions of the leather band intervening between the rubber protuberances 2 are brought into service to prevent skidding or slippage of the tire, and they perform their function notwithstanding the presence of the rubber protuberances intervening between the tread portions of the band.

Our tread structure preferably includes, in addition to the features of the rubber protuberances 2 and the leather band 3, metal devices that are auxiliary to the rubber and leather members and which are located in the leather band adjacent to its side edges. These metal members are cup-shaped disks 5 secured to the leather band by rivets 6. The edges of these cup-shaped disks project outwardly at the periphery of the tire and are adapted to cut into or embed themselves in the surface of either an icy or wet roadway to overcome any tendency to slippage of the tread of the tire under unusual conditions.

The metal disks 5 enter very meritoriously into the structure of our tire from the fact that they are located adjacent to the edges of the leather band 3 and at points where there are slight areas of the rubber anti-slipping protuberances 2. The disks, therefore, serve to prevent slippage of the tread of the tire at the portions of its tread not adequately provided with non-slipping rubber tread members, and the office of these disks is more particularly brought into play when a wheel on which the tire is used is turning a curve and the tire is therefore forced laterally, so that an edge portion of the tire tread is brought into contact with the roadway.

We claim:—

1. In a vehicle wheel tire, a rubber tread member having protuberances of rubber at its periphery, and a leather band encircling said tread member, the said band being provided with narrow slits extending transversely thereof expanded to permit the projection of the rubber protuberances therethrough and provide for the thickening of the band intermediate of the protuberances.

2. In a vehicle wheel tire, a rubber tread member having approximately elliptical shaped protuberances of rubber at its periphery, and a leather band encircling said tread member, the said band being provided with narrow slits extending transversely thereof expanded to permit the projection of the rubber protuberances therethrough and provide for the thickening of the band intermediate of the protuberances.

3. In a vehicle wheel tire, a rubber tread member having protuberances of rubber at its periphery, of dovetail shape in cross-section, and a leather band encircling said tread member, the said band being provided with narrow slits extending transversely thereof expanded to permit the projection of the rubber protuberances therethrough, and provide for the thickening of the band intermediate of the protuberances.

MARK A. DEES.
T. M. DEES.

In the presence of—
E. B. LINN,
A. J. McCAULEY.